United States Patent [19]

Zaruba et al.

[11] 3,955,691

[45] May 11, 1976

[54] APPARATUS FOR FILLING AND DISCHARGING TOWER-SHAPED STORAGE SPACES

[75] Inventors: Jiri Zaruba; Josef Fruehauf; Jan Mikulik; Bohumil Vodenka, all of Prague, Czechoslovakia

[73] Assignee: Stredisko pro vynalezy a zlepsovaci navrhy, Prague, Czechoslovakia

[22] Filed: Oct. 8, 1974

[21] Appl. No.: 513,047

[52] U.S. Cl. .......................... 214/17 CB; 214/17 DB
[51] Int. Cl.² ........................................ B65G 65/32
[58] Field of Search ................... 214/17 CB, 17 DB; 302/56, 60

[56] References Cited
FOREIGN PATENTS OR APPLICATIONS
1,044,970  10/1966  United Kingdom ............ 214/17 CB Primary Examiner—Robert G. Sheridan

[57] ABSTRACT

Tower silos and similar tower-shaped storage spaces for solid material are filled and discharged by means of a device arranged vertically slidably on a hollow post and capable of rotating around its vertical axis. The device comprises distributing means, maintained at a constant height above the top level of the material; the filling is accomplished pneumatically through the hollow post and the discharge is accomplished through a central space left after removal of a piston taken along in the course of filling by the distributing means.

5 Claims, 4 Drawing Figures

APPARATUS FOR FILLING AND DISCHARGING TOWER-SHAPED STORAGE SPACES

An object of this invention is the provision of an arrangement for filling and discharging tower-shaped storage spaces, particularly tower silos, towers for low moisture content silage of hay and other storage towers.

Most frequently used arrangements for filling of tower-shaped storage spaces with solid agricultural materials are throwers, pneumatic conveyors and chopper-blowers. The transport conduits of these conveying means situated on the exterior of the mantle of the storage space terminate in an end piece of different design, the purpose of which is to separate air from conveyed material and to direct its course. A common feature of these transport systems is their low efficiency caused by high losses in the end pieces of the supply conduits. A substantial drawback is also the fact that it is impossible to achieve thereby a uniform distribution of the fodder in the whole cross-section of the tower, with a resulting non-uniform stress on the structure of the tower. It is therefore necessary for the attendant to adjust baffle plates of the feeding conduit in order to rectify the stream of material. But, despite that, a higher layer of fodder is formed on one side than on the other side, even if the end piece on the conduit rotates uniformly.

Lateral forces acting on the tower walls are generated due to compression of the material in a thus-filled storage space if the material is distributed in this manner. It is therefore impossible to design tower-shaped storage spaces of larger diameter due to the action of the wind, the overall areas of the storage space and the whole mass of the filled storage space.

In order to eliminate the non-uniform distribution of material it is advantageous to use some distributing means, which is for instance necessary when filling tower-shaped storage spaces by a mechanical conveyor which discharges the material through an opening in the roof of the tower without the possibility of a uniform distribution of the material.

The major problem, however, remains the discharge of tower-shaped storage spaces. The discharge of material from cylindrical towers is solved by discharge devices of different design with removal of the material at the bottom or at the top. The major drawbacks of discharge devices with removal of the material at the bottom is their low efficiency and the difficult disengagement of the device in case of some operating difficulty. Due to the low efficiency of discharge devices with removal of the material at the bottom, it is necessary, when they are used in connection with high capacity stables, to build special storage bins.

Discharge devices with removal of material at the top require a special arrangement of the mantle of the storage space provided with openings capable of being closed and also provided with a throw shaft. In addition, it requires some special means for maintaining the device in a horizontal plane and for feeding the material into the throw shaft. There are also systems of similar devices which discharge the material by way of a central throw shaft, built in the stored material in the course of filling. The discharge devices with removal of material at the top do not comply with requirements from the point of view of either hygiene or safety of working conditions and in case of removal of operating troubles, a number of serious, even fatal, accidents have occurred. The discharge devices with removal of material at the top are not satisfactory in their output with respect to requirements of practice.

SUMMARY OF THE INVENTION

It is an object of this invention to eliminate to a high degree the drawbacks in connection with filling and discharging of tower-shaped storage places and to provide an arrangement which operates efficiently and safely, does not require any special attendance, and which allows the construction of relatively large tower-shaped storage spaces.

The arrangement according to this invention comprises in the tower-shaped storage space at its vertical axis a rotatably supported hollow post, on which post at least one take-along arm is slidably supported by means of sleeves, with a distributing device, advantageously using rotating spike wheels, fixed on this arm; a piston is also slidingly supported by these sleeves with respect to the post. An adjustable end piece terminates in the upper part of the rotatable hollow post into the tower-shaped storage space.

A driving wheel, provided with spurs, is rotatably supported on the end of the take-along arm, with a sprocket wheel fixed to this driving wheel, the sprocket connected by a chain with a second sprocket fixed on a shaft, which in turn is rotatably supported on the take-along arm. The other end of this shaft is connected with the input shaft of a gear case, also supported by means of sleeves slidable with respect to the rotatable post. The output shaft of the gear case, the axis of which coincides with the longitudinal axis of the rotatable post, is provided with a worm, meshing with a worm wheel. A sprocket, above which a guiding roller is situated, is fixed to the worm wheel. The worm wheel, the sprocket wheel and the guiding wheel are supported by their journals on connecting pieces of the sleeves. The sprocket and the guiding roller are encompassed by a link chain, the upper end of which is suspended on the upper part of the rotatable post, while a spring is fixed to the lower end of the link chain, this spring being connected to a set screw, anchored to the lower part of the rotatable post.

The arrangement according to this invention combines the solution of problems of filling and discharging of tower-shaped storage spaces to a single technical fundamental solution. It enables a uniform distribution of the material to a homogenous layer in the whole cross-section of the tower, achieving a higher specific mass of the stored material with a better utilization of the useful space with respect to other systems, resulting in a saving of the useful space and thus also of investment costs. The requirements for the length of chopped straw are equally different, whose length can be twice the length of that used in presently known systems. Thus a higher efficiency of chopper-blowers is achieved, reducing the harvest costs. When filling the tower-shaped storage space by pneumatic conveyors, the efficiency is substantially increased as losses in the end piece are eliminated.

The arrangement forms furthermore a support of the roof; it reinforces the tower construction and enables the construction of towers of larger diameter.

For discharging of the storage spaces, the arrangement has an efficiency which is a multiple of actual known arrangements. The hygiene and safety of the operation are much greater than those of known systems, as it operates fully automatically without requiring human attention.

The arrangement serves different purposes; in addition to the described purpose, it serves as a support for the roof construction, it can be used as a rotatable pillar crane in the course of building the tower, for maintenance and similar operations.

BRIEF DESCRIPTION OF DRAWINGS

An exemplary embodiment of the object of this invention is schematically indicated in the attached drawings wherein.

DESCRIPTION OF PREFERRED EMBODIMENTS

Figure 1:
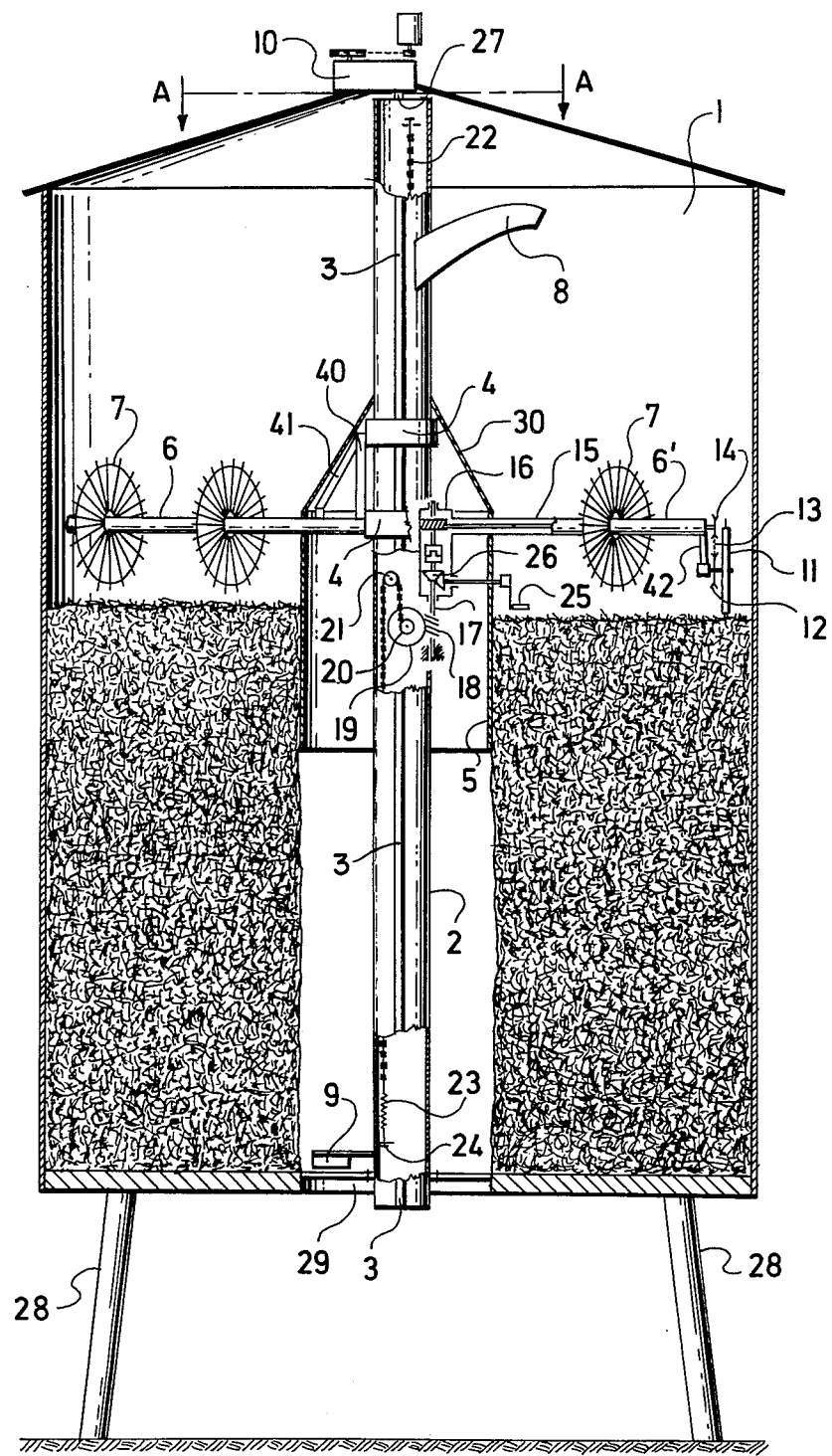
FIG. 1 is an overall sectional elevation of the entire arrangement.

A rotatable hollow post 2 is arranged coaxially of the vertical axis of a tower-shaped storage space 1, with longitudinal take-along ribs 3 on the post 2 for taking along a distributing device, arranged vertically slidably on said post 2. Sleeves 4 are provided slidably on the post 2, with a hollow piston 5 having a conical extension 30 on its top and at least one arm 6 fixed to these sleeves 4 advantageously by means of a bracket 41, the arm 6 supporting a distributing device; advantageously one or more spike wheels 7 are provided. An adjustable mouthpiece 8 is provided in the upper part of the hollow rotatable post 2. The sleeves 4 are mutually connected by connecting pieces 40. It is, of course, possible to use instead of two shorter sleeves 4 a single long sleeve.

The tower-shaped storage space 1 as shown in FIG. 1 is resting on supporting columns 28 so that a manipulating space is created below the storage space 1. An opening 29 is provided in the bottom, by means of which the content of the storage space 1 is emptied. The piston 5 closes, in its lowest position, said opening 29. One or more shuffle arms 9 are fixed on the lower part of the post 2. Some conveyor means can be provided below the opening 29 for conveying the material to the place where it is used. The supply of material to the storage space 1 is accomplished pneumatically through the hollow post 2 by joining the outlet tube of a pneumatic conveyor to the bottom of this post 2. In an alternative arrangement a tube can be fixed to the opening 29 in the bottom of the storage space 1 by means of which the discharged material is taken away. In that case the tower-shaped storage space 1 need not be supported on columns 28.

An electric motor with a gear case 10 is situated in the upper part of this storage space 1, the output shaft of which gear case 10 being connected to the shaft 27 of the rotatable post 2. A driving wheel 11 provided on its circumference with spurs is supported rotatably on the end of a hollow arm 6' by means of a bracket 42. A sprocket 12 is fixed to this driving wheel 11, which is connected by a chain 13 with another sprocket 14 affixed to the end of a shaft 15 rotatably supported inside the hollow take-along arm 6'. The other end of shaft 15 passes through the mantle of the piston 5 and transmits its rotating motion via a gear case 16 to the vertical output shaft 17.

The vertical output shaft 17 is provided with a worm 18, the teeth of which engage with the teeth of a worm wheel 19, the journal of which is fixed to an extension of a connecting piece 40 of the sleeves 4. A sprocket wheel 20' is fixed to the worm wheel 19, with a guiding roller 21, the journal of which is fixed to an extension of a connecting piece of the sleeves 4 situated above the sprocket 20. A link chain 22 is suspended on the upper part of the rotatable post 2, this link chain 22 passing coincidentally with the vertical axis of post 2 on its external part downwards, encompassing the sprocket wheel 20 and the guiding roller 21 situated above it and again proceeding downwards. The lower end of the link chain 22 is connected to a spring 23, connected in turn to a set screw 24, anchored in the lower part of the rotatable post 2. A manually operated crank 25 is provided in the upper part of the piston 5, connected via a bevel gear 26 to the output shaft 17 of the gear case 16.

The mouth of a thrower, of a pneumatic conveyor, or of a chopper-blower terminates into the lower end of the hollow rotatable post 2. The cut material passes upwards through the rotating post 2 and its stream is directed by the adjustable mouthpiece 8 in the tower-shaped storage space 1. The baffle plate of the adjustable mouthpiece 8 has a swinging motion, facilitating the distribution of the conveyed material. The material, in the course of filling of the tower-shaped storage space 1 adjusted to a uniform layer by the distributing device, for instance by spike wheels 7 rotatably supported on the take-along arms 6, is turned together with the rotating post 2. The spike wheels 7 are rotating automatically due to engagement of the spikes into the material and due to the turning of the arms 6 which take along these spike wheels 7.

Figure 3:
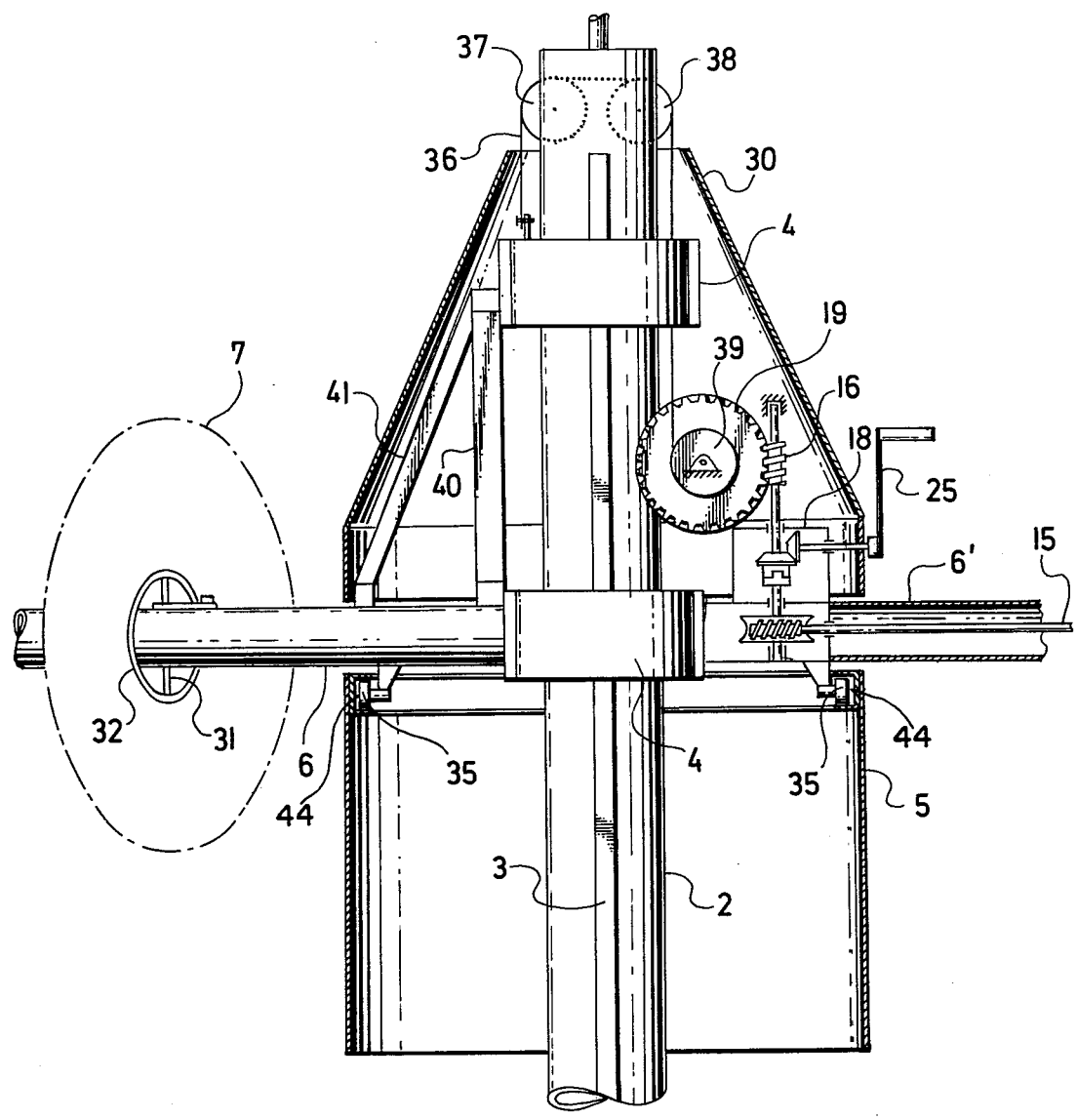
FIG. 3 is an elevation of an alternative arrangement for raising and lowering the distributing device.
Figure 4:
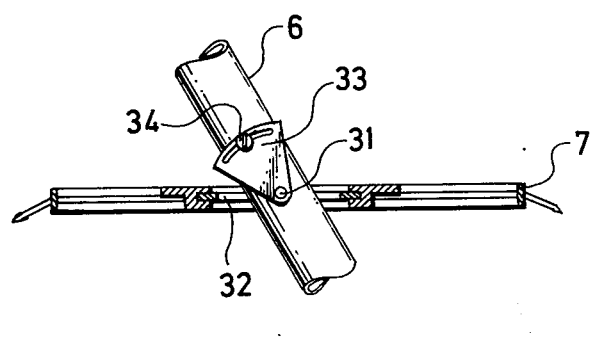
FIG. 4 is a top view of an alternative of an adjustable support of a spike wheel.
Figure 2:
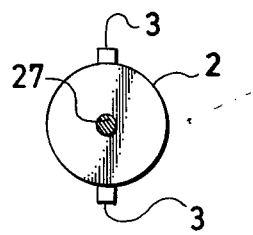
FIG. 2 is a section of the post along a plane indicated in FIG. 1 by line A—A.

The distributing effect of the spike wheels 7 is caused by the fact that they rotate in a plane which is not coincident with the direction of their forward movement. There are a number of possibilities for achieving this effect. One exemplary arrangement thereof is indicated in FIGS. 3 and 4.

A disc 32 is swingably supported by means of a vertical stud 31 on the distributing arm 6. The position of this disc 32 is adjustable with respect to the axis of the distributing arm 6 and can be secured by a screw 34. The spike wheel 7 is freely rotatably supported on this disc 32. The spikes extending beyond the spike wheel 7 can be advantageously inclined with respect to the plane of the spike wheel 7.

Another possibility is to support the disc 32 on the distributing arm 6 by means of a spherical supporting piece, whereby the inclination of the extending spikes with respect to the plane of the stored material can be simultaneously adjusted. There is furthermore a possibility to arrange the take-along arm 6 angularly adjustably with respect to the axis of the hollow post 2, whereby the required inclination of the spike wheels 7 can be simultaneously adjusted. The raising of the distributing device and of the piston 5 which forms a central throw shaft in the shaped material, depends on the speed of increase of the height of the stored material. In the course of turning of the take-along arms 6, the driving wheel 11 engages with its spurs into the surface of the stored material. The rotating motion of the driving wheel 11 is transmitted by the sprocket 12, the chain 13, the further sprocket 14 over the shaft 15 to the gear case 16 and therefrom over the output shaft 17 with the worm 18 to the worm wheel 19 and thus to the sprocket 20 which starts to turn along the link chain 22 causing a raising of the sleeves 4, of the arms 6 with the spike wheels 7 and of the piston 5 along the rotatable post 2.

The whole distributing device with the piston 5 is raised until the driving wheel 11 loses contact with the surface of the stored material. The transmission ratio between the driving wheel 11 and the sprocket wheel 20 is chosen so that the speed of raising is higher than the highest possible speed of increase of height of the stored material. Similarly, if the supply of the stored material is stopped, the raising of the device is equally stopped, so that the piston 5 cannot be raised beyond the level of the stored material even if the post 2 and the whole arrangement continues to rotate. If the material has to be preserved by silage or low moisture content silage of hay, it is possible to suspend on the take-along arms 6 some working means securing the concentration of the material.

If the material has to be discharged from the storage space 1, the piston 5 is removed and the inclination of the spike wheels 7 is adjusted for discharging. In case of the opposite direction of rotation of the post 2, the mechanism brings the operating elements in engagement, whereby the required speed of discharge of the material can be adjusted by adjustment of the transmission ratio between the driving wheel 11 and the sprocket 20. The shuffle arm 9 on the lower end of the rotatable post 2 facilitates the discharge of the material from the central throw shaft. The manual crank 25 serves for raising the arrangement on the post 2 when the post 2 is not turning, for instance, if the inclination of the spike wheels 7 has to be adjusted.

FIG. 3 shows another arrangement of the distributing device. The piston 5 is in this case not fixed to the sleeves 4 but is only suspended thereon by means of rollers 35 guided in circumferential grooves 44 of the piston 5, so that the piston 5 does not perform the rotating motion together with the hollow post 2, but is solely raised or lowered by the sleeves 4. The conical extension 30 of the piston 5 remains, however, firmly connected with the sleeves 4. This arrangement is suitable where a higher friction is generated between the stored material and the raised piston 5.

Another difference in FIG. 3 with respect to the arrangement shown in FIG. 1 is that the distributing device is raised by means of a rope. The sleeves 4 are suspended on a rope 36 which is guided over rolls 37, 38 on the top of the hollow post 2 and wound on a drum 39 connected with the worm wheel 39 of the driving means. The operation of this device is the same as earlier described in connection with FIG. 1.

Although the invention is illustrated and described with reference to a plurality of preferred embodiments thereof, it is to be understood that it is in no way limited to the disclosure of such a plurality of preferred embodiments, but is capable of numerous modifications within the scope of the appended claims.

What is claimed is:

1. Apparatus for filling and discharging tower-shaped storage spaces with solid material, comprising a vertical hollow central rotatable post in the tower-shaped storage space, said rotatable post serving for the supply of the material into the storage space, a piston coaxial of the post and slidable therealong progressively to form a central hollow space in the deposited solid material in the storage space, at least one slidable sleeve on the post connected to the piston for sliding therewith along the post, and at least one radially extending arm connected to the sleeve, a distributing device for the stored material supported on said radially extending arm, a mouthpiece for filling the storage space provided on the upper part of the hollow post, means for automatically detecting the height of the material in the storage space, and means controlled by these detecting means for automatically adjusting the height of the distributing means.

2. Apparatus as in claim 1, comprising spike wheels rotatably supported on the radially extending arm connected to the sleeve, the angular position of the axis of rotation of the spike being adjustable with respect to the longitudinal axis of the radially extending arm.

3. Apparatus as in claim 1, comprising spike wheels rotatably supported on the radially extending arm connected to the sleeve, the angular position of the spike wheels with respect to the radially extending arm being adjustable.

4. Apparatus as in claim 1, comprising a driving wheel with circumferential extensions rotatably supported on the end of a radially extending arm, said extensions being adapted for engagement into the surface of the stored material and being rotated thereby upon the turning of the hollow post, and means drivingly connecting the post and the means for maintaining the distributing device at the level of the stored material.

5. Apparatus for filling and discharging tower-shaped storage spaces, comprising a vertical central hollow rotatable post in the tower-shaped storage space, at least one sleeve arranged for vertical sliding on the post, a piston coaxial of the post and slidable therealong progressively to form a central hollow space in the deposited solid material in the storage space, and at least one take-along arm connected to the sleeve and piston so as to move therewith with respect to the post, a distributing device for the stored material supported on said take-along arm, a mouthpiece for filling the storage space provided on the upper part of the hollow post, and means for maintaining the distributing device at the level of the stored material comprising a driving wheel with circumferential extensions rotatably supported on the end of a take-along arm, said extensions being adapted for engagement into the surface of the stored material and being rotated thereby upon the turning of the hollow post and means for transmitting this rotating motion to means for maintaining the distributing device at the level of the stored material.

* * * * *